United States Patent
Nakayama et al.

(10) Patent No.: US 10,431,348 B2
(45) Date of Patent: *Oct. 1, 2019

(54) PRESSURE SENSOR INCLUDING ELECTRICAL CONDUCTORS COMPRISING ELECTROCONDUCTIVE RESIN COMPOSITION THAT DOES NOT NEED CROSS-LINKING

(71) Applicant: Hitachi Metals, Ltd., Tokyo (JP)

(72) Inventors: Akinari Nakayama, Hitachinaka (JP); Takashi Aoyama, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/955,244

(22) Filed: Apr. 17, 2018

(65) Prior Publication Data

US 2018/0277280 A1    Sep. 27, 2018

Related U.S. Application Data

(63) Continuation of application No. 15/124,480, filed as application No. PCT/JP2014/057420 on Mar. 18, 2014, now Pat. No. 9,991,022.

(51) Int. Cl.
*G01L 1/00* (2006.01)
*H01B 1/24* (2006.01)
(Continued)

(52) U.S. Cl.
CPC ............. *H01B 1/24* (2013.01); *C08K 3/04* (2013.01); *C08L 23/02* (2013.01); *C08L 23/12* (2013.01);
(Continued)

(58) Field of Classification Search
CPC .... G01L 1/00; G01L 1/20; G01L 1/22; H01B 1/24; C08L 23/02; C08L 23/12;
(Continued)

(56) References Cited

U.S. PATENT DOCUMENTS 9,991,022 B2 * 6/2018 Nakayama ............... G01L 1/22
2002/0022687 A1 * 2/2002 Hikita ...................... C08L 23/10
524/528

FOREIGN PATENT DOCUMENTS

JP        60-008362 A    1/1985
JP        60-042461 A    3/1985
(Continued)

OTHER PUBLICATIONS

Chinese Office Action issued in Chinese Application No. 201480077082.8 dated Jul. 11, 2018.
(Continued)

*Primary Examiner* — Harshad R Patel
*Assistant Examiner* — Nigel H Plumb
(74) *Attorney, Agent, or Firm* — Roberts Mlotkowski Safran Cole & Calderon P.C.

(57) ABSTRACT

A pressure sensor includes an insulator having a hollow portion; and a plurality of electrical conductors that have been disposed apart from each other along the inner surface facing the hollow portion of the insulator. The insulator comprises an insulating resin composition made of a material which does not need cross-linking, the plurality of electrical conductors comprise an electroconductive resin composition made of a material which does not need cross-linking, the insulating resin composition and the electroconductive resin composition comprise a process oil, and a mass percentage concentration of the process oil in the electroconductive resin composition is higher than a mass percentage concentration of the process oil in the insulating resin composition.

14 Claims, 3 Drawing Sheets

(51) Int. Cl.
   *C08L 23/02*   (2006.01)
   *G01L 1/20*    (2006.01)
   *G01L 1/22*    (2006.01)
   *C08L 53/02*   (2006.01)
   *C08L 23/12*   (2006.01)
   *C08L 53/00*   (2006.01)
   *C08L 91/00*   (2006.01)
   *C08K 3/04*    (2006.01)

(52) U.S. Cl.
   CPC ............ *C08L 53/00* (2013.01); *C08L 53/025* (2013.01); *C08L 91/00* (2013.01); *G01L 1/20* (2013.01); *G01L 1/22* (2013.01); *C08L 2203/20* (2013.01)

(58) Field of Classification Search
   CPC .... C08L 23/025; C08L 53/00; C08L 2203/20; C08K 3/00; G01B 7/18; G01B 7/16; G01B 5/30
   See application file for complete search history.

(56) References Cited

FOREIGN PATENT DOCUMENTS

| JP | 10-53677 A    | 2/1998  |
|----|---------------|---------|
| JP | 10-281906 A   | 10/1998 |
| JP | 2001-183247 A | 7/2001  |
| JP | 2005-149760 A | 6/2005  |
| JP | 2011144270 A  | 7/2011  |
| JP | 2011-162745 A | 8/2011  |
| JP | 2011195618 A  | 10/2011 |

OTHER PUBLICATIONS

Wen Zhiyuan et al., "Plastic Molding Process and Device", Beijing Institute of Technology Press, Jun. 27, 2018, 11 pages.
International Search Report issued in a corresponding application PCT/JP2014/057420 dated Jun. 17, 2014.
Notification of Transmittal of Translation of the International Preliminary Report on Patentability issued in the corresponding PCT/JP2014/057420 dated Sep. 29, 2016.
Notification of Reason(s) for Refusal issued in the corresponding Japanese Application No. 2016-508381 dated Jan. 24, 2017.
Extended European Search Report issued in the corresponding EP Application No. 14885949.9 dated Jun. 29, 2017.
A Chinese Office Action issued in corresponding Chinese Application No. 201480077082.8 dated Mar. 15, 2019.
ShangLi Yang et al., "Introduction to Material Physics", Harbin Institute of Technology Press, Aug. 1998, 8 pages.
Office Action issued in corresponding Chinese Application No. 201480077082.8 dated Jun. 24, 2019.

* cited by examiner

PRESSURE SENSOR INCLUDING ELECTRICAL CONDUCTORS COMPRISING ELECTROCONDUCTIVE RESIN COMPOSITION THAT DOES NOT NEED CROSS-LINKING

TECHNICAL FIELD

The present invention relates to an electroconductive resin composition and a pressure sensor.

BACKGROUND ART

Conventional pressure sensors in which plural electrical conductors are arranged apart from each other are known (see, e.g., PTLs 1 and 2). Such pressure sensors become in an electrically conducted state by contact between the plural electrical conductors when receiving an external force, thereby functioning as a switch.

The pressure sensor described in PTL 1 has a structure in which four linear electrode wires are spirally arranged with spaces therebetween so as not to be in contact with each other along an inner peripheral surface of a cylindrical insulation, and is thereby capable of reliably detecting an external force in all directions. These electrode wires are each composed of an electrical conductor formed by twisting tin-plated soft copper wires, and a conductive rubber covering the surface thereof. It is disclosed that the conductive rubber contains carbon black.

A cord switch described in PTL 2 is a linear pressure sensor and has a structure in which an end portion of a rubber cover covering the outer periphery of a cylindrical insulation is sealed with a hot-melt resin. Curing time of a sealant is reduced since the hot-melt resin is used as the sealant, and it is thus possible to efficiently manufacture the cord switch. The plural electrical conductors provided in this cord switch are each composed of a core wire and a conductive resin covering the surface thereof. The details of the conductive resin are not disclosed.

Meanwhile, a highly processable conductive rubber composition used as a material for electrical conductor of pressure sensor is known (see, e.g., PTL 3). The conductive rubber composition described in PTL 3 is obtained by adding an ethylene-α-olefin copolymer and carbon as a conductivity imparting agent to a base rubber having a Mooney viscosity $ML_{1+4}$ (100° C.) of not more than 40.

CITATION LIST

Patent Literature

[PTL 1]
JP-B-3275767
[PTL 2]
JP-A-2005-149760
[PTL 3]
JP-A-2011-162745

SUMMARY OF INVENTION

Technical Problem

It is one of objects of the invention to provide an electroconductive resin composition which can be produced at low cost and is suitable as a material for electrical conductors of a pressure sensor, and a pressure sensor including electrical conductors constituted of the electroconductive resin composition.

Solution to Problem

To achieve the object described above, an embodiment of the invention provides a pressure sensor comprising: an insulator having a hollow portion; and a plurality of electrical conductors that have been disposed apart from each other along the inner surface facing the hollow portion of the insulator, wherein the plurality of electrical conductors comprise an electroconductive resin composition that includes both a styrene-based thermoplastic elastomer and carbon.

Also, another embodiment of the invention provides an electroconductive resin composition, comprising: a styrene-based thermoplastic elastomer and carbon.

Advantageous Effects of Invention

According to the invention, it is possible to provide an electroconductive resin composition which can be produced at low cost and is suitable as a material for electrical conductors of a pressure sensor, and a pressure sensor including electrical conductors constituted of the electroconductive resin composition.

DESCRIPTION OF EMBODIMENT

[Embodiment]
(Configuration of Pressure Sensor)

Figure 1:
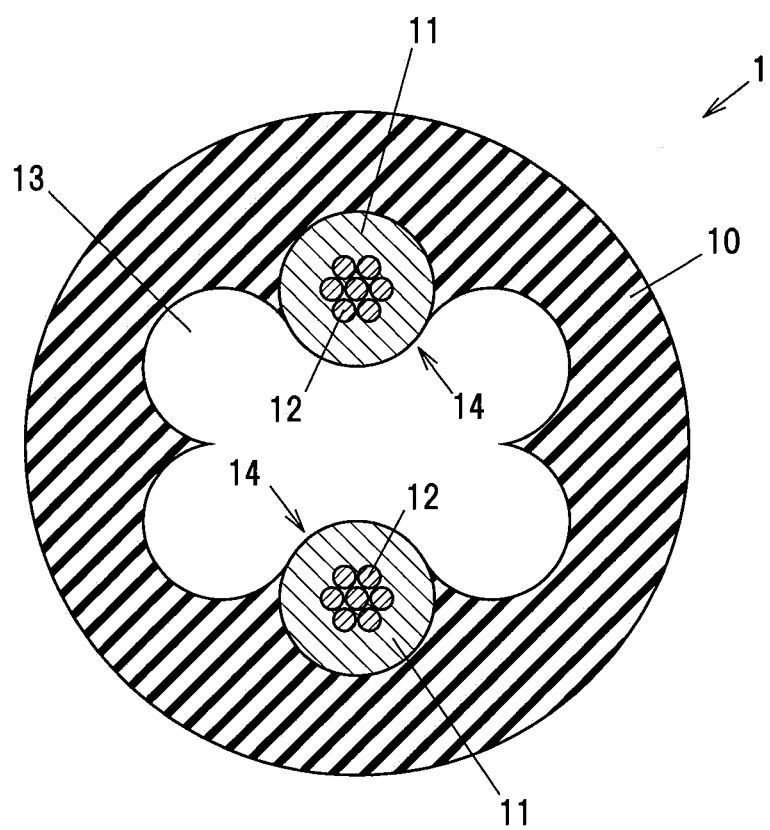
FIG. 1 is a radial cross sectional view showing a linear pressure sensor in an embodiment.

FIG. 1 is a radial cross sectional view showing a linear pressure sensor 1 in the embodiment.

The pressure sensor 1 has an insulator 10 having a hollow portion 13 and plural electrical conductors 11 arranged apart from each other along an inner surface of the insulator 10 facing the hollow portion 13. The electrical conductor 11 covers a core wire 12, and the electrical conductor 11 and the core wire 12 constitutes an electrode wire 14 of the pressure sensor 1. Two electrical conductors 11 come into contact with each other and are electrically conducted when an external force is applied to the pressure sensor 1, and the pressure sensor 1 thereby functions as a switch.

The pressure sensor 1 is a linear pressure sensor, in which two electrode wires 14 are spirally arranged with a space so as not to be in contact with each other. However, the structure of the pressure sensor 1 is not limited to such a structure. For example, the number of the electrical conductors 11 may be three, and the insulator 10 and the electrical conductor 11 may have a shape other than a linear shape, such as a flat plate shape.

The core wire 12 is, e.g., a twisted wire composed of 26 to 30 AWG silver-plated soft copper wires.

The electrical conductor 11 is formed of an electroconductive resin composition containing a styrene-based thermoplastic elastomer and carbon. It is not necessary to cross-link the styrene-based thermoplastic elastomer when molding. Therefore, it is possible to simplify the manufacturing process of the electrical conductor 11 and to reduce the manufacturing cost, as compared to when using a material which needs to be cross-linked when molding, such as EPDM (ethylene-propylene-diene rubber).

The styrene-based thermoplastic elastomer is a thermoplastic elastomer with styrene blocks at both ends of its molecules. Examples of the styrene-based thermoplastic elastomer include SEBS with styrene blocks at both ends of EB (ethylene-butylene), SEPS with styrene blocks at both ends of EP (ethylene-propylene) and SEEPS with styrene blocks at both ends of EEP (ethylene-ethylene-propylene).

The molecular weight of the styrene-based thermoplastic elastomer is preferably about 100,000 to 200,000. When the molecular weight is more than 200,000, the surface of the electrical conductor 11 after extrusion molding may be rough. It is considered that this is because, when the molecular weight of the styrene-based thermoplastic elastomer is too large, molecular chains are less likely to entangle at the time of kneading and this decreases dispersibility of a crystalline polyolefin (described later), etc.

The electroconductive resin composition constituting the electrical conductor 11 preferably contains a crystalline polyolefin. When kneading a material of the electrical conductor 11 in an extruder at a temperature higher than the melting point of the crystalline polyolefin, the material of the electrical conductor is kneaded in a state that the crystalline polyolefin is in the form of liquid. Then, after molded into the electrical conductor 11, the crystalline polyolefin crystallizes in the electrical conductor 11 at ambient temperature (25° C.).

Figure 2A:
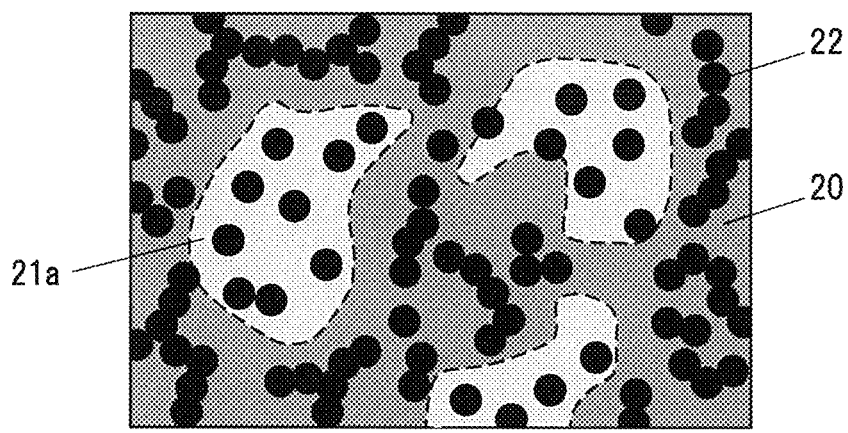
FIG. 2A is a schematic diagram illustrating the internal state of an electrical conductor at a temperature higher than a melting point of a crystalline polyolefin.

FIG. 2A is a schematic diagram illustrating the internal state of the electrical conductor 11 at a temperature higher than a melting point of the crystalline polyolefin. In FIG. 2A, a region surrounded by a dotted line shows a liquid crystalline polyolefin 21a in a styrene-based thermoplastic elastomer 20. As shown in FIG. 2A, carbon 22 is contained in the styrene-based thermoplastic elastomer 20 as well as in the liquid crystalline polyolefin 21a at a temperature higher than the melting point of the crystalline polyolefin.

Figure 2B:
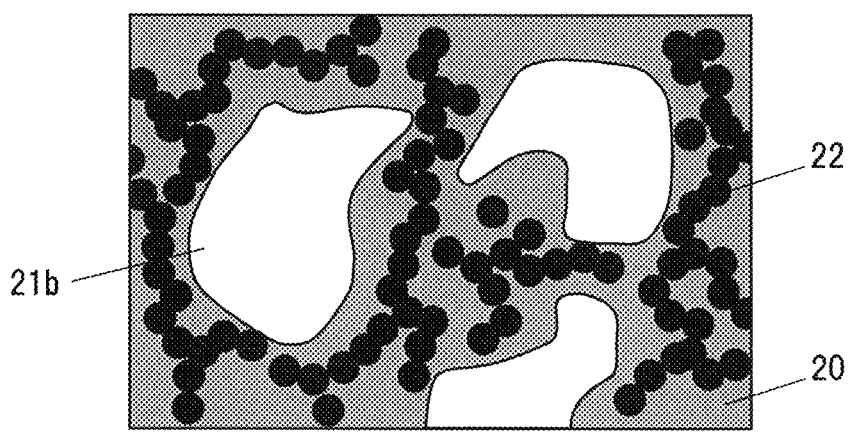
FIG. 2B is a schematic diagram illustrating the internal state of the electrical conductor at a temperature lower than a melting point of a crystalline polyolefin.

FIG. 2B is a schematic diagram illustrating the internal state of the electrical conductor 11 at a temperature lower than a melting point of the crystalline polyolefin. A crystallized crystalline polyolefin 21b shown in FIG. 2B is a result from crystallization of the liquid crystalline polyolefin 21a caused by temperature drop. Due to the crystallization of the crystalline polyolefin, the carbon 22 contained in the liquid crystalline polyolefin 21a is pushed out into the styrene-based thermoplastic elastomer 20. Then, many conductive paths are formed by the resulting aggregation of carbon and conductivity of the electrical conductor 11 is improved. In addition, since conductivity can be obtained with the smaller amount of the carbon 22 than when not using the crystalline polyolefin, it is possible to reduce the amount of the carbon 22, thereby reducing the manufacturing cost of the electrical conductor 11.

Generally, kneading in an extruder is carried out at a temperature of about 180 to 230° C. Therefore, it is preferable to use a crystalline polyolefin having a melting point of not more than 180° C. and also not less than 25° C. (ambient temperature). As such a crystalline polyolefin, it is possible to use, e.g., polypropylene having a melting point of about 140 to 160° C., polyethylene having a melting point of about 100 to 140° C., or EVA (ethylene-vinyl acetate copolymer) having a melting point of about 80° C. It is particularly preferable to use polypropylene as the crystalline polyolefin since it shows affinity for the styrene-based thermoplastic elastomer and the particle size after crystallization is not too large due to good dispersibility.

When using polypropylene as the crystalline polyolefin, a ratio of the mass of the polypropylene contained in the electrical conductor 11 to the mass of the carbon contained in the electrical conductor 11 is preferably not less than 0.20 and not more than 1.10. It is possible to efficiently improve conductivity of the electrical conductor 11 when the ratio is not less than 0.20. On the other hand, when the ratio is more than more than 1.10, a low-temperature elastic modulus of the electrical conductor 11 exceeds the desired value.

In addition, the polypropylene is preferably of a reactor blend type. When using, e.g., a block copolymer polypropylene, the low-temperature elastic modulus of the electrical conductor 11 tends to exceed the desired value.

The carbon in the electroconductive resin composition constituting the electrical conductor 11 is added for the purpose of imparting conductivity to the electrical conductor 11. The carbon is preferably particulate carbon such as carbon black. When using carbon in the form other than particle, e.g., in the form of wire or sheet, the level of electrical resistivity of the electrical conductor 11 varies depending on a direction, which may adversely affect the operation of the pressure sensor 1. Here, carbon black is fine particles of carbon obtained by the incomplete combustion of oil or gas and having a diameter of about 3 to 500 nm. Conductive carbon black having a developed structure of connected elementary carbon particles is particularly preferable.

In addition, it is preferable that the average particle size of the particular carbon be smaller than the average particle size of the crystalline polyolefin after crystallization. In this case, movement of carbon from liquid crystalline polyolefin into the styrene-based thermoplastic elastomer caused by crystallization of the crystalline polyolefin as shown in FIGS. 2A and 2B is likely to occur and it is thus possible to effectively improve conductivity of the electrical conductor 11. The average particle size of, e.g., polypropylene after crystallization is about 0.1 to 1.0 μm. As such, it is possible to effectively improve conductivity of the electrical conductor 11 by using carbon black and polypropylene respectively as the carbon and the crystalline polyolefin.

A mass percentage concentration of the carbon in the electroconductive resin composition constituting the electrical conductor 11 is preferably not less than 18 mass %. The electrical conductor 11 thereby have a sufficiently small volume resistivity. The mass percentage concentration of the carbon is calculated by dividing the mass of the carbon by the total mass of the electroconductive resin composition (the mass of the electrical conductor 11) and then multiplying the obtained value by 100.

The insulating resin composition constituting the insulator 10 preferably contains a styrene-based thermoplastic elastomer in the same manner as the electroconductive resin composition constituting the electrical conductor 11. It is not necessary to cross-link the styrene-based thermoplastic elastomer when molding. Therefore, it is possible to simplify the manufacturing process of the insulator 10 and to reduce the manufacturing cost.

The insulating resin composition constituting the insulator 10 and the electroconductive resin composition constituting the electrical conductor 11 contain a process oil. Preferably, a mass percentage concentration of the process oil in the electroconductive resin composition constituting the electrical conductor 11 is higher than a mass percentage concentration of the process oil in the insulating resin composition constituting the insulator 10. The process oil here is an oil to be added to the insulator 10 and the electrical conductor 11 to increase plasticity and to reduce hardness, and also functions as a medium for the carbon in the electrical conductor 11.

The process oil in a region with its high concentration moves to a region with low concentration. Therefore, if the mass percentage concentration of the process oil in the electroconductive resin composition constituting the electrical conductor 11 is lower than the mass percentage concentration of the process oil in the insulating resin composition constituting the insulator 10, the process oil in the insulator 10 moves into the electrical conductor 11. This increases the interparticle distance of the carbon in the electrical conductor 11 and decreases conductivity of the electrical conductor 11. However, such a problem can be prevented by adjusting the mass percentage concentration of the process oil in the electroconductive resin composition constituting the electrical conductor 11 to be higher than the mass percentage concentration of the process oil in the insulating resin composition constituting the insulator 10.

The process oil is preferably a paraffin-based oil. Low-temperature elastic moduli of the insulator 10 and the electrical conductor 11 tend to exceed the desired values more when using a paraffin-based oil composed of linear molecules than when using, e.g., a naphthene-based oil or an aromatic oil composed of planar molecules. It is considered that this is because intermolecular interaction is lower and fluidity is less likely to be reduced even at a low temperature in the oil composed of linear molecules than in the oil composed of planar molecules.

(Method of Manufacturing the Pressure Sensor)

A method of manufacturing the pressure sensor 1 will be described below as an example.

Firstly, the electrical conductors 11 are formed by extrusion molding using an extruder to cover the surfaces of the core wires 12, thereby forming two electrode wires 14. Here, the cross-linking process is not performed since the electrical conductor 11 does not contain a material which needs to be cross-linked.

Next, a first linear spacer for forming the center portion of the hollow portion 13 and second linear spacers for forming the peripheral portion of the hollow portion 13 are formed.

Next, four second spacers and the two electrode wires 14 are alternately arranged around the first spacer and are then twisted together.

Next, the insulator 10 is formed by extrusion molding to cover the four second spacers and the two electrode wires 14 which are twisted together around the first spacer.

Next, the first spacer and the second spacers are pulled out, thereby forming the hollow portion 13. The pressure sensor 1 is formed through the steps described above.

The manufacturing process of the pressure sensor 1 in the present embodiment is based on the manufacturing process of a pressure sensor disclosed in Japanese Patent No. 3275767, but the electrical conductor 11, or the electrical conductor 11 and the insulator 10, is/are not cross-linked at the time of molding.

(Effects of the Embodiment)

In the embodiment, an electrical conductor is formed of an electroconductive resin composition which can be produced at low cost and is suitable as a material for electrical conductors of a pressure sensor, thereby allowing a pressure sensor to be obtained at low cost.

EXAMPLES (Evaluation of the Electroconductive Resin Composition)

Sixteen types of electroconductive resin compositions (Samples 1 to 16) having different constituent components or proportions were formed and evaluated for volume resistivity (Ohm·cm), Mooney viscosity, Shore A hardness, and elastic modulus (MPa) at low temperature (−30° C.). Then, electrode wires were formed by extruding Samples 1 to 16 of the electroconductive resin compositions to cover core wires, and extruded appearance (outer appearance of the electrode wire) was evaluated.

The Mooney viscosity was measured at 180° C. by a method in accordance with JIS K 6300-1. The value after 7 minutes of preheating and 4 minutes of shearing ($ML_{7+4}$ (180° C.)) was defined as Mooney viscosity. The volume resistivity was measured on Samples 1 to 16 of the electroconductive resin compositions in the form of sheet by a method in accordance with JIS K 7194 (four terminal four-probe method). The Shore A hardness was measured on Samples 1 to 16 of the electroconductive resin compositions in the form of sheet by a method in accordance with ASTM D2240. The low-temperature elastic modulus was measured at a frequency of 10 Hz at −30° C. by a method in accordance with JIS K 7244-4.

The electrode wires used for the evaluation of the extruded appearance were formed by covering core wires (twisted wires each composed 26 AWG silver-plated soft copper wires) with electrical conductors formed of Samples 1 to 16 of the electroconductive resin compositions so as to have an outer diameter of 1.0 mm.

Tables 1 and 2 below show the constituent components of Samples 1 to 16 of the electroconductive resin compositions and the evaluation results of Samples 1 to 16.

TABLE 1

|  | Product name | Sample 1 | Sample 2 | Sample 3 | Sample 4 | Sample 5 | Sample 6 | Sample 7 | Sample 8 |
| --- | --- | --- | --- | --- | --- | --- | --- | --- | --- |
| Carbon | Ketjenblack EC-600JD | 25 | 25 | 25 | 25 | 25 | 25 | 25 | 25 |
| Crystalline polyolefin | WELNEX RGF4VM | 5 | 10 | 15 | 20 | 25 | 15 |  | 15 |
|  | PM580X |  |  |  |  |  |  | 15 |  |
| Process oil | LUCANT HC-40 | 60 | 60 | 60 | 60 | 60 | 60 | 60 | 60 |
| Styrene-based | SEPTON 4055 | 35 | 30 | 25 | 20 | 15 | 25 | 25 |  |
| thermoplastic elastomer | SEPTON 4099 |  |  |  |  |  |  |  | 25 |
| Antioxidant | IRGANOX 1010 | 0.1 | 0.1 | 0.1 | 0.1 | 0.1 | 0.1 | 0.1 | 0.1 |
| Total mass (kg) |  | 125.1 | 125.1 | 125.1 | 125.1 | 125.1 | 128.1 | 125.1 | 125.1 |

TABLE 1-continued

| Product name | Sample 1 | Sample 2 | Sample 3 | Sample 4 | Sample 5 | Sample 6 | Sample 7 | Sample 8 |
|---|---|---|---|---|---|---|---|---|
| Carbon concentration (mass %) | 20.0 | 20.0 | 20.0 | 20.0 | 20.0 | 21.9 | 20.0 | 20.0 |
| (Crystalline polyolefin/Carbon) Mass ratio | 0.20 | 0.40 | 0.60 | 0.80 | 1.00 | 0.54 | 0.60 | 0.60 |
| (Crystalline polyolefin + Carbon) concentration (mass %) | 24.0 | 28.0 | 32.0 | 36.0 | 40.0 | 33.6 | 32.0 | 32.0 |
| Process oil concentration (mass %) | 48.0 | 48.0 | 48.0 | 48.0 | 48.0 | 46.8 | 48.0 | 48.0 |

| Evaluation item | Target value | | | | | | | | |
|---|---|---|---|---|---|---|---|---|---|
| Volume resistivity (Ohm · cm) | ≤1.2 | 0.794 | 0.753 | 0.712 | 0.671 | 0.625 | 0.412 | 0.693 | 0.715 |
| Mooney viscosity [$ML_{7+4}$ (180° C.)] | ≤150 | 106 | 101.9 | 97 | 92 | 88 | 145 | 101 | 84 |
| Shore A hardness | | 84 | 84 | 90 | 94 | 98 | 98 | 96 | 93 |
| Low-temperature elastic modulus (MPa) | ≤500 | 178 | 254 | 330 | 406 | 482 | 430 | 352 | 340 |
| Extruded appearance | | Δ | ○ | ○ | ○ | ○ | ○ | ○ | Δ |

TABLE 2

| | Product name | Sample 9 | Sample 10 | Sample 11 | Sample 12 | Sample 13 | Sample 14 | Sample 15 | Sample 16 |
|---|---|---|---|---|---|---|---|---|---|
| Carbon | Ketjenblack EC-600JD | 25 | 24 | 19 | 22 | 25 | 28 | 25 | 25 |
| Crystalline polyolefin | WELNEX RGF4VM | 20 | 20 | 0 | 0 | 0 | 0 | 30 | 5 |
| Process oil | LUCANT HC-40 | 52 | 60 | 60 | 60 | 60 | 60 | 50 | |
| | PW-380 | | | | | | | 10 | 60 |
| Styrene-based thermoplastic elastomer | SEPTON 4055 | 30 | 30 | 40 | 40 | 40 | 40 | 10 | 35 |
| Antioxidant | IRGANOX 1010 | 0.1 | 0.1 | 0.1 | 0.1 | 0.1 | 0.1 | 0.1 | 0.1 |
| Total mass (kg) | | 127.1 | 134.1 | 119.1 | 122.1 | 125.1 | 128.1 | 125.1 | 125.1 |
| Carbon concentration (mass %) | | 19.7 | 17.9 | 16.0 | 18.0 | 20.0 | 21.9 | 20.0 | 20.0 |
| (Crystalline polyolefin/Carbon) Mass ratio | | 0.80 | 0.83 | 0.00 | 0.00 | 0.00 | 0.00 | 1.20 | 0.20 |
| (Crystalline polyolefin + Carbon) concentration (mass %) | | 35.4 | 32.8 | 16.0 | 18.0 | 20.0 | 21.9 | 44.0 | 24.0 |
| Process oil concentration (mass %) | | 40.9 | 44.7 | 50.4 | 49.1 | 48.0 | 46.8 | 48.0 | 48.0 |

| Evaluation item | Target value | | | | | | | | |
|---|---|---|---|---|---|---|---|---|---|
| Volume resistivity (Ohm · cm) | ≤1.2 | 0.721 | 0.956 | 4.95 | 2.6 | 1.26 | 0.833 | 0.603 | 0.735 |
| Mooney viscosity $ML_{7+4}$ (180° C.) | ≤150 | 88 | 85 | 71.3 | 91.4 | 129.8 | 175 | 85 | 94 |
| Shore A hardness | | 95 | 94 | 66 | 71 | 73 | 80 | 98 | 90 |
| Low-temperature elastic modulus (MPa) | ≤500 | 418 | 410 | 56 | 71.8 | 102 | 136 | 558 | 530 |
| Extruded appearance | | ○ | ○ | ○ | ○ | Δ | X | ○ | Δ |

Masses (kg) of the carbon, the crystalline polyolefin, the process oil and the styrene-based thermoplastic elastomer contained in each electroconductive resin composition sample are shown in the upper rows of Tables 1 and 2. Meanwhile, the total mass (kg) of a material, the carbon concentration (mass %), the mass ratio of the carbon to the crystalline polyolefin, the concentration (mass %) of the total of the crystalline polyolefin and the carbon, and the process oil concentration (mass %) in each electroconductive resin composition sample are shown in the middle rows of Tables 1 and 2.

Ketjenblack EC-600JD used as the carbon is carbon black (manufactured by Ketjen Black International Company). WELNEX RGF4VM used as the crystalline polyolefin is a reactor blend type polypropylene (manufactured by Japan Polypropylene Corporation) which has a density of 0.89 g/cm$^3$, a MFR (Melt Flow Rate) of 6.0 g/10 min and a bending elastic modulus of 280 MPa. PM580X used as the crystalline polyolefin is a block copolymer polypropylene (manufactured by SunAllomer Ltd.) which has a density of 0.9 g/cm$^3$, a MFR of 5.0 g/10 min and a bending elastic modulus of 1300 MPa. LUCANT HC-40 used as the process oil is an ethylene-α-olefin co-oligomer (manufactured by Mitsui Chemicals, Inc.) which has a kinetic viscosity of 40 mm$^2$/s at 100° C. PW-380 used as the process oil is a mineral oil (manufactured by Idemitsu Kosan Co., Ltd.) which contains 27% of naphthene component and 73% of paraffin component and has a kinetic viscosity of 30 mm$^2$/s. SEPTON 4055 used as the styrene-based thermoplastic elastomer is SEEPS (manufactured by Kuraray Co., Ltd) which contains 30% of styrene component and has a molecular weight of 130,000. SEPTON 4099 used as the styrene-based thermoplastic elastomer is SEEPS (manufactured by Kuraray Co., Ltd) which contains 30% of styrene component and has a molecular weight of 320,000. IRGANOX 1010 used as antioxidant is pentaerythritol tetrakis[3-(3,5-di-tert-butyl-4-hydroxyphenyl)propionate] (manufactured by BASF) which is added to eliminate an effect of oxidative degradation in a heat-aging test (described later) conducted on the pressure sensor.

The target value for each evaluation is a value as a material for the electrical conductor of the electrode wire of pressure sensor. The symbol "○" in the section of Extruded appearance means that roughness was virtually not observed on the outer appearance, the symbol "Δ" means that slight roughness was observed, and the symbol "X" means that roughness was observed and was to the extent that it is problematic for practical use.

Samples 1 to 10 are the samples exhibiting satisfactory results for the evaluations of volume resistivity, Mooney viscosity, low-temperature elastic modulus and extruded appearance. On the other hand, Samples 11 to 16 are the samples exhibiting an unsatisfactory result for at least one of the evaluations of volume resistivity, Mooney viscosity, low-temperature elastic modulus and extruded appearance.

When comparing Samples 3 and 7 which contain different types of crystalline polyolefins, Sample 3 had the better low-temperature elastic modulus. It is considered that this is because Sample 3 contains a reactor blend type polypropylene while Sample 7 contains a block copolymer polypropylene.

When comparing Samples 3 and 8 which contain different types of styrene-based thermoplastic elastomers, the electrode wire having an electrical conductor formed of Sample 3 had the better result in extruded appearance. It is considered that this is because dispersibility of the crystalline polyolefin was reduced in Sample 8 since the molecular weight of the styrene-based thermoplastic elastomer was too large.

Samples 11 and 14 did not contain a crystalline polyolefin and thus had a low volume resistivity. Table 2 shows that the volume resistivity decreases with an increase in the carbon concentration in Samples 11 to 14. However, even Sample 14 having the highest carbon concentration thereamong has a higher volume resistivity than Samples 1 and 9.

Figure 3:
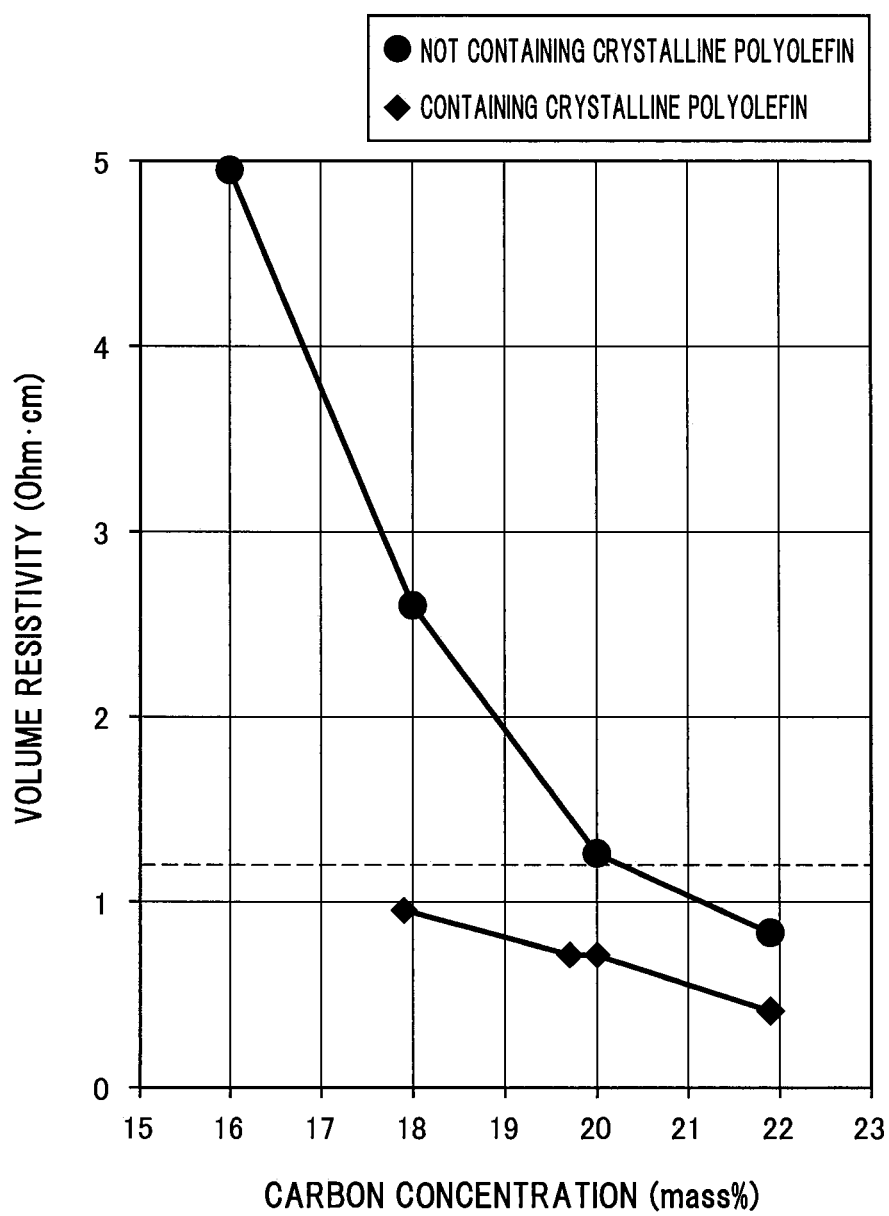
FIG. 3 is a graph showing a relation between a carbon concentration (mass %) and volume resistivity (Ohm·cm) in electroconductive resin compositions of Examples respectively when containing and when not containing a crystalline polyolefin.

FIG. 3 is a graph showing a relation between a carbon concentration (mass %) and volume resistivity (Ohm·cm) respectively when the electroconductive resin composition contains and does not contain a crystalline polyolefin. The plot marks "♦" are the values of Samples 3, 6, 9 and 10 and show a relation when the electroconductive resin composition contains a crystalline polyolefin. The plot marks "●" are the values of Samples 11 to 14 and show a relation when the electroconductive resin composition does not contain a crystalline polyolefin.

Meanwhile, the evaluation results of Samples 11 to 14 show that the Mooney viscosity increases with an increase in the carbon concentration in the electroconductive resin composition, which causes a decrease in moldability and resulting deterioration in extruded appearance. On the other hand, for example, Sample 6 is excellent in extruded appearance even though the Mooney viscosity is high. It is considered that this is because moldability is less likely to decrease in the electroconductive resin composition containing the crystalline polyolefin even if the carbon concentration is increased.

Sample 15, which contains a crystalline polyolefin, achieved the target volume resistivity but had a low-temperature elastic modulus exceeding the target value. It is considered that this is because a ratio of the mass of the crystalline polyolefin to the mass of the carbon in Sample 15 was too large. Based on the results that the ratio of the mass of the polypropylene to the mass of the carbon was 1.20 in Sample 15 and the ratio of the mass of the polypropylene to the mass of the carbon was not less than 0.20 and not more than 1.0 in Samples 1 to 8 which achieved the target low-temperature elastic modulus, the preferred ratio of the mass of the polypropylene to the mass of the carbon in the electroconductive resin composition is considered to be about not less than 0.20 and not more than 1.0.

In Sample 16, a crystalline polyolefin was contained and the ratio of the mass of the crystalline polyolefin to the mass of the carbon was 0.20 which is the same value as Sample 1, but the low-temperature elastic modulus was more than the target value. It is considered that this is because the process oil in Sample 16 contains a naphthene component.

(Evaluation of the Pressure Sensor)

Next, eight types of pressure sensors (Samples A to H) were formed so that the respective electrical conductors of the electrode wires were formed of electroconductive resin compositions composed of different components and the insulators were formed of insulating resin compositions composed of different components. Then, the ON resistance (Ohm), the ON resistance (Ohm) after the heat-aging test at 100° C. for 1000 hours, the ON load (N), and the ON load (N) at low temperature (−30° C.) were evaluated.

The pressure sensor samples A to H here have an insulator having a hollow portion and two electrode wires formed in a double spiral structure so as to be provided apart from each other along the inner surface in the hollow portion, in the same manner as the pressure sensor 1 shown in FIG. 1. The shape of the hollow portion is also the same as that of the pressure sensor 1 shown in FIG. 1. The electrode wires were formed using Samples 3, 5, 6, 12 and 16. A space between the electrode wires was 1.8 mm and an outer diameter of the insulator was 5.0 mm.

In the ON resistance test, 20 N of load was applied to round bar-shaped indenters of 4 mm in diameter placed on the pressure sensor samples A to H so as to cross substantially orthogonal thereto, electrical resistance at the moment of occurrence of electrical conduction between the two electrode wires was measured 10 times, and the average value thereof was calculated. This average value is the ON resistance value in Table 4. In the ON resistance test after the heat-aging test, the same ON test was conducted after the heat-aging test at 100° C. for 1000 hours.

In the ON load test, a load was gradually applied to round bar-shaped indenters of 4 mm in diameter placed on the pressure sensor samples A to H so as to cross substantially orthogonal thereto, and a load at which electrical resistance of the pressure sensor reached 100 Ohm was measured. In the ON load test under the low temperature conditions, the same ON load test was conducted at a temperature of −30° C.

Table 3 below shows three types of insulating resin compositions and process oil concentrations used for the insulators in Samples A to H.

TABLE 3

|  | Product name | Formulation L | Formulation M | Formulation N |
| --- | --- | --- | --- | --- |
| Process oil | LUCANT HC-40 | 100 | 82 | 85 |
| Styrene-based thermoplastic elastomer | SEPTON 4055 | 65 | 60 | 60 |
|  | Kraton RP6935 | 25 | 20 | 20 |
| Heavy calcium carbonate | SOFTON 1200 | 10 | 20 | 20 |
| Antioxidant | IRGANOX 1010 | 0.1 | 0.1 | 0.1 |
| Process oil concentration (mass %) |  | 50.0 | 45.1 | 45.9 |

Kraton RP6935 used as the styrene-based thermoplastic elastomer is SEBS (manufactured by Kraton Polymers) which contains 58% of styrene component and has a molecular weight of 200,000. SOFTON 1200 used as heavy calcium carbonate is heavy calcium carbonate (manufactured by Bihoku Funka Kogyo Co., Ltd.) which has a particle size of 1.8 μm and has an oil absorption of 36 cc/100 g.

Table 4 below shows the types of electroconductive resin compositions used to form electrical conductors and insulating resin compositions used to form insulators in Samples A to H, and the respective evaluation results of Samples A to H.

TABLE 4

|  | | Sample A | Sample B | Sample C | Sample D |
|---|---|---|---|---|---|
| Electroconductive resin composition | | Sample 3 | Sample 3 | Sample 5 | Sample 6 |
| Process oil concentration (mass %) | | 48.0 | 48.0 | 48.0 | 46.9 |
| Insulating resin composition | | Formulation M | Formulation N | Formulation M | Formulation N |
| Process oil concentration (mass %) | | 45.1 | 45.9 | 45.1 | 45.9 |
| Evaluation item | Target value | | | | |
| ON resistance (Ohm) | ≤30 | 15.2 | 15.7 | 17.2 | 18.4 |
| ON resistance after Heat-aging test | | 16.4 | 16.3 | 18.1 | 19.0 |
| ON load (N) | ≤15 | 3.6 | 3.4 | 3.8 | 4.1 |
| ON load (N) under low temperature conditions | | 10.2 | 10.8 | 14.1 | 13.6 |

|  | | Sample E | Sample F | Sample G | Sample H |
|---|---|---|---|---|---|
| Electroconductive resin composition | | Sample 3 | Sample 6 | Sample 12 | Sample 16 |
| Process oil concentration (mass %) | | 48.0 | 46.8 | 49.2 | 48.0 |
| Insulating resin composition | | Formulation L | Formulation L | Formulation M | Formulation L |
| Process oil concentration (mass %) | | 50.0 | 50.0 | 45.1 | 50.0 |
| Evaluation item | Target value | | | | |
| ON resistance (Ohm) | ≤30 | 15.5 | 19.1 | 41.9 | 18.7 |
| ON resistance after Heat-aging test | | 52.3 | 42.8 | 44.7 | 54.4 |
| ON load (N) | ≤15 | 4.4 | 3.7 | 4.2 | 4.0 |
| ON load (N) under low temperature conditions | | 11.7 | 12.4 | 20.3 | 17.6 |

Samples A to D are the samples exhibiting satisfactory results for all four types of evaluations. On the other hand, Samples E to D are the samples exhibiting an unsatisfactory result for at least one of the evaluations.

The ON resistance values of Samples E, F and H after heat-aging were more than the target value. It is considered that this is because the process oil concentration in Samples E, F and H was higher in the insulating resin composition than in the electroconductive resin composition, and the process oil thus moved from the insulator into the electrical conductors.

Sample G exhibited the unsatisfactory results for both the ON resistance and the post-heat-aging ON resistance since the electroconductive resin composition constituting the electrical conductor was Sample 12 having a large volume resistivity.

Summary Of The Embodiment

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A pressure sensor (1), comprising: an insulator (10) having a hollow portion (13); and a plurality of electrical conductors (11) that have been disposed apart from each other along the inner surface facing the hollow portion (13) of the insulator (10), wherein the plurality of electrical conductors (11) comprise an electroconductive resin composition that includes both a styrene-based thermoplastic elastomer and carbon.

[2] The pressure sensor (1) defined by [1], wherein the electroconductive resin composition comprises a crystalline polyolefin.

[3] The pressure sensor (1) defined by [2], wherein the crystalline polyolefin has a melting point of not less than 25° C. and not more than 180° C.

[4] The pressure sensor (1) defined by [3], wherein the crystalline polyolefin is polypropylene.

[5] The pressure sensor (1) defined by [4], wherein a ratio of the mass of the polypropylene contained in the electroconductive resin composition to the mass of the carbon contained in the plurality of electrical conductors (11) is not less than 0.20 and not more than 1.10.

[6] The pressure sensor defined by any one of [1] to [5], wherein the electroconductive resin composition has a volume resistivity of not more than 1.0 Ohm·cm.

[7] The pressure sensor (1) defined by any one of [1] to [5], wherein a mass percentage concentration of the carbon in the electroconductive resin composition is not less than 18 mass %.

[8] The pressure sensor (1) defined by any one of [1] to [5], wherein the insulator (10) comprises an insulating resin composition containing a styrene-based thermoplastic elastomer.

[9] The pressure sensor (1) defined by [8], wherein the insulating resin composition and the electroconductive resin composition comprise a process oil, and a mass percentage concentration of the process oil in the electroconductive resin composition is higher than a mass percentage concentration of the process oil in the insulating resin composition.

[10] The pressure sensor (1) defined by [9], wherein the process oil is a paraffin-based oil.

[11] The pressure sensor (1) defined by any one of [1] to [5], wherein the carbon is in the form of particle.

[12] The pressure sensor (1) defined in any one of [2] to [5], wherein the average particle size of the carbon is smaller than the average particle size of the crystalline polyolefin.

[13] The pressure sensor (1) defined by any one of [1] to [5], wherein the insulator (10) has a cylindrical shape, and the plurality of electrical conductors (11) extend spirally in a longitudinal direction of the insulator (10) along the inner surface of the insulator (10).

[14] An electroconductive resin composition, comprising a styrene-based thermoplastic elastomer; carbon; and a crystalline polyolefin.

[15] The electroconductive resin composition defined by [14], wherein the crystalline polyolefin has a melting point of not less than 25° C. and not more than 180° C.

[16] The electroconductive resin composition defined by [15], wherein the crystalline polyolefin is polypropylene.

[17] The electroconductive resin composition defined by [16], wherein a ratio of the mass of the polypropylene to the mass of the carbon is not less than 0.20 and not more than 1.10.

[18] The electroconductive resin composition defined by any one of [14] to [17], wherein a volume resistivity is not more than 1.0 Ohm·cm.

[19] The electroconductive resin composition defined by any one of [14] to [17], wherein a mass percentage concentration of the carbon is not less than 18 mass %.

[20] The electroconductive resin composition defined by any one of [14] to [17], comprising a paraffin-based oil.

[21] The electroconductive resin composition defined by any one of [14] to [17], wherein the carbon is in the form of particle.

[22] The electroconductive resin composition defined by any one of [14] to [17], wherein the average particle size of the carbon is smaller than the average particle size of the crystalline polyolefin.

Although the embodiment and Examples of the invention have been described, the invention is not to be limited to the embodiment and Examples, and the various kinds of modifications can be implemented without departing from the gist of the invention. For example, the invention is characterized in the constituent components of the electroconductive resin composition constituting the electrical conductor and is thus applicable to pressure sensors having any configurations.

In addition, an antioxidant, an anti-aging agent, an antiozonant, a metal chelator, a flame retardant, a colorant, a foaming agent, a lubricant, a stabilizer, a filler, a compatibilizing agent and a reinforcing agent can be appropriately added to the resin composition used for the electrical conductor or the insulator without departing the scope of the requirements of [1] to [20].

In addition, the invention according to claims is not to be limited to the above-mentioned embodiment and Examples. Further, please note that all combinations of the features described in the embodiment and Examples are not necessary to solve the problem of the invention.

INDUSTRIAL APPLICABILITY

Provided are an electroconductive resin composition which can be produced at low cost and is suitable as a material for electrical conductors of a pressure sensor, and a pressure sensor including electrical conductors constituted of the electroconductive resin composition.

REFERENCE SIGNS LIST

1: PRESSURE SENSOR
10: INSULATOR
11: ELECTRICAL CONDUCTOR
12: CORE WIRE
13: HOLLOW PORTION
14: ELECTRODE WIRE
20: STYRENE-BASED THERMOPLASTIC ELASTOMER
21A, 21B: CRYSTALLINE POLYOLEFIN
22: CARBON

The invention claimed is:

1. A pressure sensor, comprising:
an insulator having a hollow portion; and
a plurality of electrical conductors that have been disposed apart from each other along the inner surface facing the hollow portion of the insulator,
wherein the insulator comprises an insulating resin composition made of a material which does not need cross-linking,
wherein the plurality of electrical conductors comprise an electroconductive resin composition made of a material which does not need cross-linking,
wherein the insulating resin composition and the electroconductive resin composition comprise a process oil, and a mass percentage concentration of the process oil in the electroconductive resin composition is higher than a mass percentage concentration of the process oil in the insulating resin composition.

2. The pressure sensor according to claim 1, wherein the electroconductive resin composition that includes both a styrene-based thermoplastic elastomer and carbon.

3. The pressure sensor according to claim 2, wherein the electroconductive resin composition comprises a crystalline polyolefin.

4. The pressure sensor according to claim 3, wherein the crystalline polyolefin comprises a polypropylene.

5. The pressure sensor according to claim 4, wherein a ratio of the mass of the polypropylene contained in the electroconductive resin composition to the mass of the carbon contained in the plurality of electrical conductors is not less than 0.20 and not more than 1.10.

6. The pressure sensor according to claim 4, wherein the polypropylene comprises a reactor blend type polypropylene.

7. The pressure sensor according to claim 3, wherein the carbon is in the form of a particle and the average particle size of the carbon is smaller than the average particle size of the crystalline polyolefin.

8. The pressure sensor according to claim 2, wherein a mass percentage concentration of the carbon in the electroconductive resin composition is not less than 18 mass %.

9. The pressure sensor according to claim 2, wherein the carbon is in the form of a particle.

10. The pressure sensor according to claim 1, wherein the electroconductive resin composition has a volume resistivity of not more than 1.0 Ohm·cm.

11. The pressure sensor according to claim 1, wherein the process oil comprises a paraffin-based oil.

12. The pressure sensor according to claim 11, wherein naphthene component is not contained in the process oil.

13. The pressure sensor according to claim 11, wherein the electroconductive resin composition comprises an elastic modulus of 500 MPa or less at a temperature of −30° C.

14. The pressure sensor according to claim 1, wherein the insulator has a cylindrical shape, and the plurality of electrical conductors extend spirally in a longitudinal direction of the insulator along the inner surface of the insulator.

* * * * *